United States Patent
Navda et al.

(10) Patent No.: US 9,253,720 B2
(45) Date of Patent: Feb. 2, 2016

(54) ENERGY-EFFICIENT ON-THE-FLY WI-FI HOTSPOT USING MOBILE DEVICES

(71) Applicant: Microsoft Corporation, Redmond, WA (US)

(72) Inventors: Vishnu Navda, Bangalore (IN); Ramachandran Ramjee, Bangalore (IN); Venkata N. Padmanabhan, Bangalore (IN); Ashish Sharma, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 40 days.

(21) Appl. No.: 14/021,135

(22) Filed: Sep. 9, 2013

(65) Prior Publication Data
US 2014/0010135 A1 Jan. 9, 2014

Related U.S. Application Data

(62) Division of application No. 12/846,110, filed on Jul. 29, 2010, now Pat. No. 8,532,074.

(51) Int. Cl.
| | | |
|---|---|---|
| G08C 17/00 | (2006.01) | |
| H04W 52/02 | (2009.01) | |
| H04W 4/00 | (2009.01) | |
| H04W 80/12 | (2009.01) | |
| H04W 88/04 | (2009.01) | |

(52) U.S. Cl.
CPC .......... H04W 52/0203 (2013.01); H04W 4/003 (2013.01); *H04W 80/12* (2013.01); *H04W 88/04* (2013.01); *Y02B 60/50* (2013.01)

(58) Field of Classification Search
CPC . H04W 52/0203; H04W 4/003; H04W 80/12; H04W 88/04; Y02B 60/50
See application file for complete search history.

(56) References Cited

U.S. PATENT DOCUMENTS

| | | | | |
|---|---|---|---|---|
| 6,505,249 | B1 * | 1/2003 | Rehkopf .................... | 709/224 |
| 8,238,913 | B1 * | 8/2012 | Bhattacharyya et al. ..... | 455/436 |
| 2002/0078315 | A1 * | 6/2002 | Howard et al. .............. | 711/162 |

* cited by examiner

*Primary Examiner* — Clemence Han
(74) *Attorney, Agent, or Firm* — Sandy Swain; Micky Minhas

(57) ABSTRACT

One or more mobile devices and a cloud server computing device are utilized to provide Internet access to one or more client computing devices. One of the clients is designated as a Wi-Fi access point. The Wi-Fi access point implements a reverse-infrastructure Wi-Fi mode which tethers available mobile devices and other clients to the access point. The cloud server periodically computes an optimal number of the mobile devices to be used for data striping, and transmits a webpage to a requesting client by striping data associated with the webpage across the optimal number of the mobile devices.

20 Claims, 7 Drawing Sheets

ENERGY-EFFICIENT ON-THE-FLY WI-FI HOTSPOT USING MOBILE DEVICES

CROSS REFERENCE TO RELATED APPLICATION

This application is a divisional of a prior application entitled "ENERGY-EFFICIENT ON-THE-FLY WI-FI HOTSPOT USING MOBILE DEVICES", which was assigned Ser. No. 12/846,110 and filed Jul. 29, 2010.

BACKGROUND

The Internet is a global data communications system that serves billions of users worldwide. The Internet provides users access to a vast array of information resources and services, including those provided by the World Wide Web, intranet-based enterprises, and the like. Mobile phones have evolved from being merely phones to being full-fledged computing and communications devices, as exemplified by the latest generation of smartphones. Correspondingly, cellular wireless networks have evolved into a near-ubiquitous infrastructure that provides users worldwide wireless network access. The number of cellular wireless network subscribers, the usage of Internet-based mobile applications on smartphones, and the number and types of cellular data services are also growing rapidly. Additionally, cloud-based services are emerging that reduce computing overhead on client computing devices. As a result, the number of users that use their smartphones to access the Internet is growing rapidly.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

On-the-fly Wi-Fi hotspot technique embodiments described herein generally involve utilizing one or more mobile devices and a cloud server computing device to provide Internet access to one or more client computing devices. In one exemplary embodiment one of the clients is designated as a Wi-Fi access point. The Wi-Fi access point implements a reverse-infrastructure Wi-Fi mode which tethers available mobile devices and other clients to the access point. In another exemplary embodiment the cloud server periodically computes an optimal number of the mobile devices to be used for data striping, and transmits a webpage to a requesting client by striping data associated with the webpage across the optimal number of the mobile devices.

DESCRIPTION OF THE DRAWINGS

The specific features, aspects, and advantages of the on-the-fly Wi-Fi hotspot (OWH) technique embodiments described herein will become better understood with regard to the following description, appended claims, and accompanying drawings where:

DETAILED DESCRIPTION

In the following description of on-the-fly Wi-Fi hotspot (OWH) technique embodiments reference is made to the accompanying drawings which form a part hereof, and in which are shown, by way of illustration, specific embodiments in which the OWH technique can be practiced. It is understood that other embodiments can be utilized and structural changes can be made without departing from the scope of the OWH technique embodiments.

The term "mobile device" is used herein to refer to a portable computing system carried by a user that connects to a Wi-Fi wireless local area network (WLAN), also connects to a cellular wireless wide area network (WWAN) (also known in the art of telecommunications as a mobile telecommunications network), and can run applications that enable Internet access. In other words, mobile devices are portable computing systems that include both a Wi-Fi WLAN radio and a cellular WWAN radio. Mobile devices may also include additional functionality such as the ability to operate as a telephone, and the like. Smartphones are but one example of such mobile devices.

1.0 Energy-efficient On-the-Fly Wi-Fi Hotspot Using Mobile Devices

Generally speaking, the OWH technique embodiments described herein utilize one or more mobile devices which are co-located in the vicinity of one or more client computing devices (hereafter simply referred to as a "clients") to create an on-the-fly, high speed, Wi-Fi hotspot that provides energy-efficient Internet access to the clients. In other words, the OWH technique embodiments utilize the one or more mobile devices to create an "opportunistic" WWAN access gateway for the clients. As will be appreciated from the more detailed description that follows, the OWH technique embodiments support a first scenario where there is a single user who desires Internet access and they have just one mobile device and one client in their possession. The OWH technique embodiments also support a second, collaborative scenario where there is a plurality of users who are co-located for a period of time (such as a plurality of family members, work colleagues, or friends), one or more of whom desires Internet access, and who as a whole possess a plurality of mobile devices which collectively can be utilized to create the WWAN access gateway.

The OWH technique embodiments described herein also utilize a cloud server computing device (hereafter simply referred to as a "cloud server") to deliver a webpage to a requesting client via the mobile devices in an energy-efficient manner. As is appreciated in the art of online information, the webpage can include one or more data objects embedded therein, where each embedded data object can be an image, a video clip, an audio clip, a document, a webpage plugin, or an applet, among other things.

1.1 Architectural Framework

Figure 1:
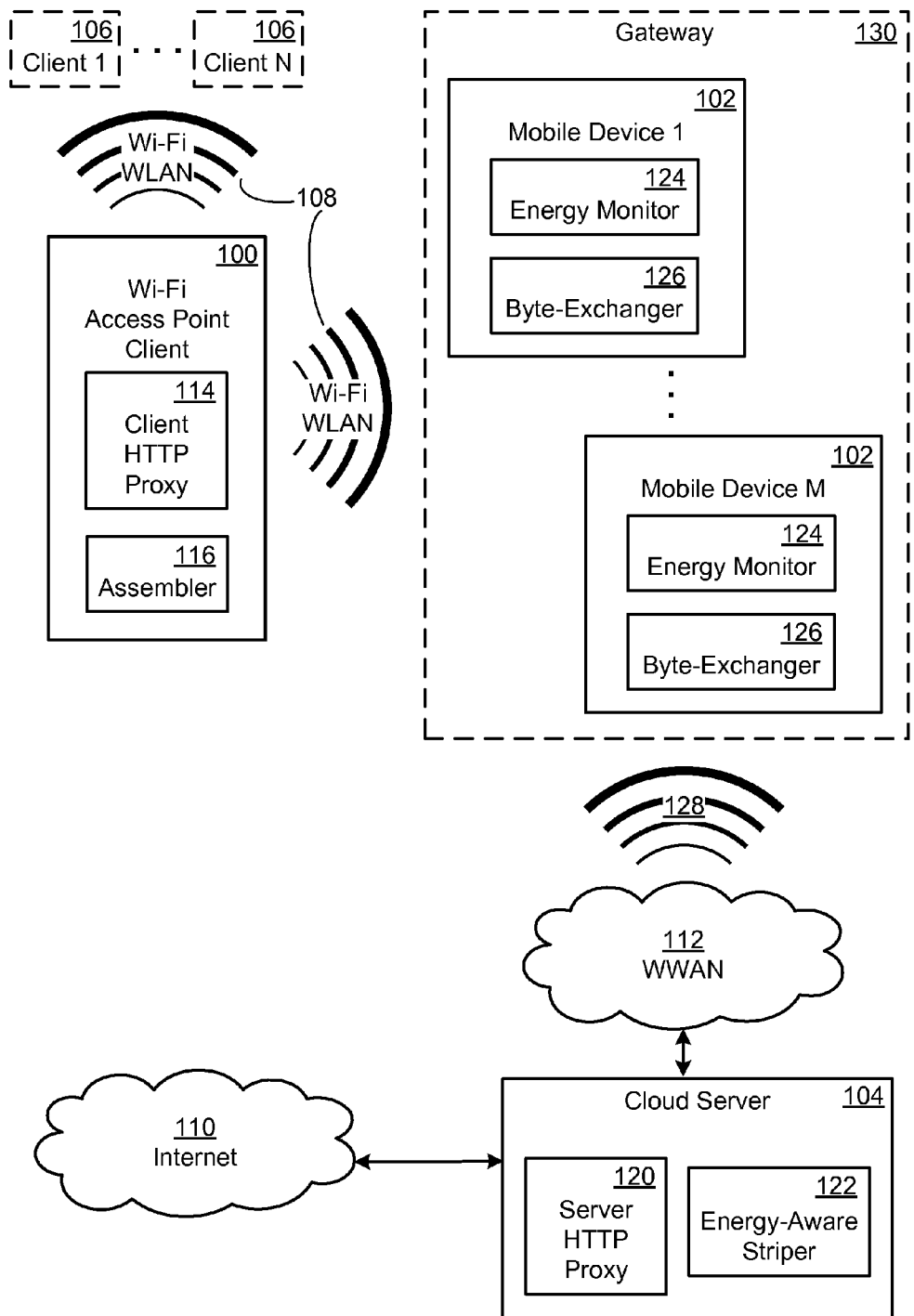
FIG. 1 is a diagram illustrating an exemplary embodiment, in simplified form, of an architectural framework for implementing the OWH technique embodiments described herein.

FIG. 1 illustrates an exemplary embodiment, in simplified form, of an architectural framework for implementing the OWH technique embodiments described herein. As exemplified in FIG. 1, the framework generally includes a first client 100, one or more mobile devices 102, and a cloud server 104. The mobile devices 102 are co-located in the vicinity of the first client 100. As described heretofore, each of the mobile devices 102 can connect to both a Wi-Fi WLAN 108 and a cellular WWAN 112, and can run applications that enable Internet 110 access. In the case where no additional clients are in the vicinity of the first client 100, the first client 100 is designated as a Wi-Fi access point (AP) by default. As such, in this case the first client 100 is hereafter referred to as a "Wi-Fi AP client 100."

Referring again to FIG. 1, the Wi-Fi AP client 100 establishes an on-the-fly Wi-Fi hotspot which generates the WLAN 108. The AP client 100 implements a reverse-infrastructure Wi-Fi mode which tethers available mobile devices 102 to the AP client via the WLAN 108. The term "available mobile devices" is used herein to refer to one or more mobile devices 102 that are co-located in the vicinity of the AP client 100, and are turned on, and are idle. A given mobile device 102 is herein considered to be idle when a user is not using it to make a telephone call or perform any type of personal computing activity thereon, and when it is not transferring data over the WLAN 108 or WWAN 112. It is noted that each available mobile device can be operating either from battery power or from an AC power source. As will be appreciated from the more detailed description of the reverse-infrastructure Wi-Fi mode that follows, the tethering of available mobile devices 102 to the AP client 100 is implemented in an energy-efficient manner.

The architectural framework exemplified in FIG. 1 can optionally also include one or more additional clients that are also co-located in the vicinity of the first client. In this case, one of the clients is designated as the Wi-Fi AP, where this designation is made by implementing a consensus-based protocol on each of the clients to select the client to be designated as the Wi-Fi AP. The client that is designated as the Wi-Fi AP is hereafter referred to as the "Wi-Fi AP client 100." The other clients that are not designated as the Wi-Fi AP are hereafter referred to as "other clients 106." After establishing an on-the-fly Wi-Fi hotspot which generates the Wi-Fi WLAN 108, the Wi-Fi AP client 100 implements the reverse-infrastructure Wi-Fi mode which tethers the other clients 106 and available mobile devices 102 to the AP client via the WLAN 108.

As is appreciated in the art of wireless communication networks and referring again to FIG. 1, the Wi-Fi WLAN 108 is based on the Institute of Electrical and Electronics Engineers (IEEE) 802.11 set of standards. The size of the vicinity surrounding the Wi-Fi AP client 100 in which the one or more mobile devices 102 and one or more other clients 106 are co-located is determined by the operating range of the Wi-Fi hotspot (i.e., the operating range of the WLAN 108). The cellular WWAN 112 supports one or more different mobile communications data services including, but not limited to, GPRS (general packet radio service—also known as "2.5G"), EDGE (enhanced data rates for GSM (global system for mobile communications) evolution—also known as "2.75G"), and 3G (third generation).

Referring again to FIG. 1, the tethered mobile devices 102 collectively serve as a WWAN access gateway 130 (i.e., a gateway link that allows the Wi-Fi AP client 100 and other clients 106 to access the cellular WWAN 112, which subsequently serves as a gateway link to the Internet 110). In other words, each mobile device 102 can be used as a gateway which provides the Wi-Fi AP client 100 and other clients 106 with access to other computing devices on the WWAN 112 including, but not limited to, the cloud server 104 which facilitates access to the Internet 110. The WWAN access gateway 130 is hereafter simply referred to as a "gateway."

As is appreciated in the art of mobile device technology and referring again to FIG. 1, the mobile devices 102 commonly operate from battery power (i.e., they are generally plugged into an AC (alternating current) power source just on occasion when their battery needs to be charged). The operating lifetime of a given mobile device depends on several different parameters which are specific to the mobile device including, but not limited to, the maximum (i.e., fully charged) capacity of the mobile device's battery, the residual battery life (i.e., the remaining battery energy), and the base battery drain rate of the mobile device. Each mobile device runs an energy monitor program module 124 that periodically computes the residual battery life of the mobile device, and can provide this information in response to queries for such from the cloud server 104, or can include this information within other responses or messages sent by the mobile device. Each mobile device also runs a byte-exchanger program module 126 which serves as a byte-level forwarder that facilitates bi-directional data communication between the Wi-Fi WLAN 108 and the cellular WWAN 112.

Referring again to FIG. 1, the Wi-Fi AP client 100 runs a client Hypertext Transfer Protocol (HTTP) proxy program module 114 (hereafter simply referred to as a "client HTTP proxy") and an assembler program module 116 (hereafter simply referred to as an "assembler"). The cloud server 104 runs a server HTTP proxy program module 120 (hereafter simply referred to as a "server HTTP proxy") and an energy-aware striper program module 122 (hereafter simply referred to as a "striper"). The operation of the client HTTP proxy 114, assembler 116, server HTTP proxy 120 and striper 122 will be described hereafter.

The OWH technique embodiments described herein are advantageous for a variety of reasons including, but not limited to, the following. Generally speaking and as will be appreciated from the more detailed description that follows, the OWH technique embodiments provide ubiquitous yet affordable Internet access for one or more clients, where the clients can either be located at a user's home, or can be located at a workplace, or can be carried by one or more users who are on the move. More particularly, for users who are on the move (i.e., users who are traveling away from their home or workplace) and thus are unable to connect to the Internet using either a broadband wired connection they may subscribe to at their home or workplace, or a Wi-Fi hotspot they may have at their home or workplace, the OWH technique embodiments provide affordable, on-the-fly (i.e., on demand) Internet access wherever the users happen to be located. In other words, the users do not have to search for an existing Wi-Fi hotspot in order to be able to access the Internet. The OWH technique embodiments also provide affordable, on-the-fly Internet access for users who do not subscribe to a broadband wired connection at their home or workplace, and/or do not have an existing Wi-Fi hotspot at their home or workplace. In each of these circumstances, the Internet access provided by the OWH technique embodiments is affordable for various reasons including, but not limited to, the following. The OWH technique embodiments utilize one or more mobile devices and one or more clients that are already owned by a given user or a co-located group of users so that the user(s) do not have to purchase any additional equipment. Additionally, the OWH technique embodiments eliminate the need for a separate WAN connection to the Internet and the subscription costs associated therewith.

The OWH technique embodiments described herein are also advantageous in that they are convenient. More particularly, the OWH technique embodiments are easy to deploy and easy to use for various reasons including, but not limited to, the following. The OWH technique embodiments are compatible with a wide variety of existing mobile devices. Minimal software changes are needed to implement the OWH technique embodiments on a given mobile device. The OWH technique embodiments result in a minimal additional computing load on the mobile device. Users do not have to install any cables between the clients and the mobile devices in order to gain Internet access. The OWH technique embodiments also automatically detect when a new mobile device becomes available in the vicinity of the Wi-Fi AP client, or when one of the existing available mobile devices becomes no longer available. Additionally, the OWH technique embodiments are fully compatible with existing client browsers and present a transparent interface to client web applications. There is also a very low latency associated with establishing the Wi-Fi WLAN connections between the Wi-Fi AP client, the mobile devices and the other clients.

The energy-efficient nature of the OWH technique embodiments is also advantageous. The energy efficiency stems from the fact that the OWH technique embodiments minimize energy consumption in each of the mobile devices that is utilized to create an on-the-fly Wi-Fi hotspot. In other words, the OWH technique embodiments conserve battery energy on each mobile device by minimizing the energy drain associated with operating the Wi-Fi WLAN radio and cellular WWAN radio therein when transmitting data to and receiving data from the Internet, especially for bursty traffic patterns such as those generated by web browsing applications on the clients. Therefore, the operating time of the mobile device and thus the Internet access time are maximized.

1.2 WWAN Radio Energy Characteristics

As is appreciated in the art of mobile device technology, the cellular WWAN radio in a mobile device is a dominant consumer of energy compared to the other electronic components in the mobile device. Exemplary notable energy characteristics of the WWAN radio will now be described.

Generally speaking and as is appreciated in the art of radio technology, the cellular WWAN radio in a mobile device goes into a low power state whenever it is idle (i.e., whenever it is not transmitting or receiving information) for a prescribed period of time. As will be exemplified hereafter, the radio exhibits a "tail" in energy consumption (hereafter simply referred to as an "energy tail") after data is transmitted or received over the WWAN. In other words, there is a residual energy cost that is sustained for a short interval of time after a data packet is transmitted or received over the WWAN before the radio goes back into the low power state. One reason for this is that the radio is maintained in a high power active/ready state by the WWAN in anticipation of subsequent data packet transmission or reception, in order to amortize for the signaling costs in the WWAN.

Figure 2A:
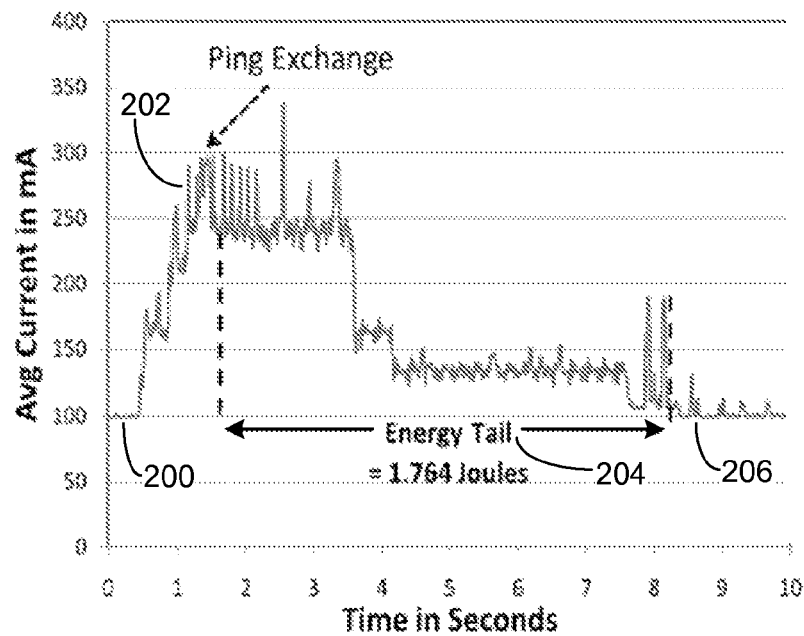
FIGS. 2A and 2B are diagrams illustrating exemplary embodiments of energy tails exhibited by a GPRS/EDGE (general packet radio service/enhanced data rates for global system for mobile communications evolution) wireless wide area network (WWAN) radio and a 3G (third generation) WWAN radio respectively.

FIG. 2A illustrates an exemplary embodiment of an energy tail exhibited by a GPRS/EDGE WWAN radio in a conventional mobile device. FIG. 2A plots the average current drawn by the radio versus time when a single ICMP (Internet Control Message Protocol) ping packet is received by the radio and a ping response packet is subsequently transmitted by the radio. As exemplified in FIG. 2A, the radio starts in a low power state 200. The ping exchange over the WWAN causes a spike in the current drawn by the radio 202, which is followed by the energy tail 204. After the energy tail 204 the radio returns to the low power state 206.

Figure 2B:
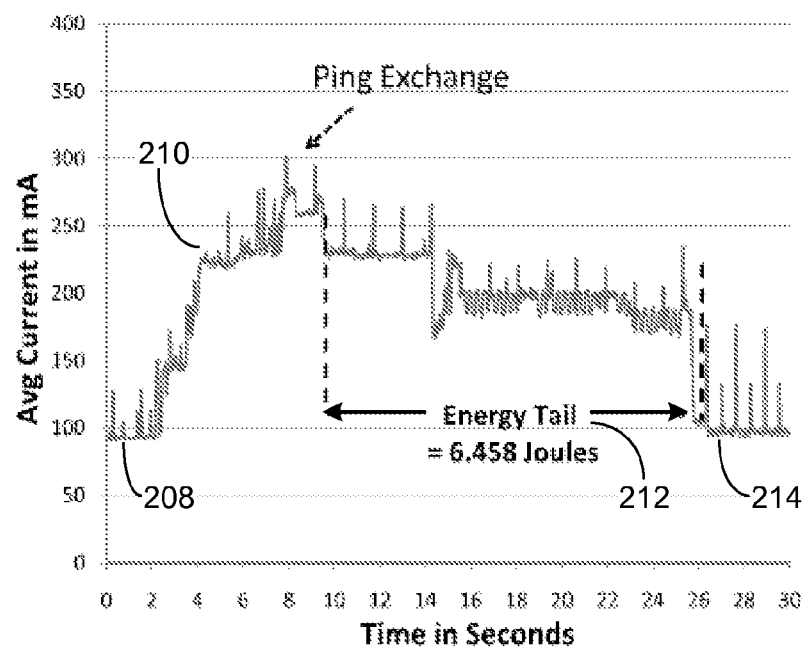

Similarly, FIG. 2B illustrates an exemplary embodiment of an energy tail exhibited by a 3G WWAN radio in a conventional mobile device. FIG. 2B plots the average current drawn by the radio versus time when a single ICMP ping packet is received by the radio and a ping response packet is subsequently transmitted by the radio. As exemplified in FIG. 2B, the radio starts in a low power state 208. The ping exchange over the WWAN causes a spike in the current drawn by the radio 210, which is followed by the energy tail 212. After the energy tail 212 the radio returns to the low power state 214.

Figure 3A:
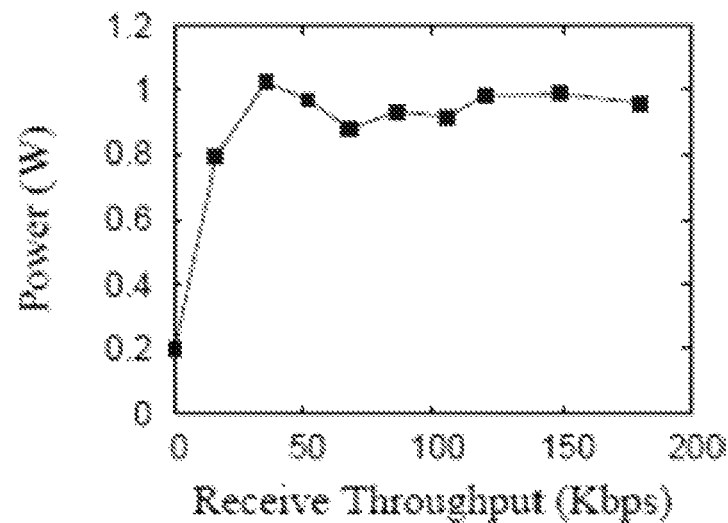
FIGS. 3A and 3B are diagrams illustrating exemplary embodiments of energy consumption versus UDP (user datagram protocol) reception data rates for a GPRS/EDGE WWAN radio and a 3G WWAN radio respectively.
Figure 3B:
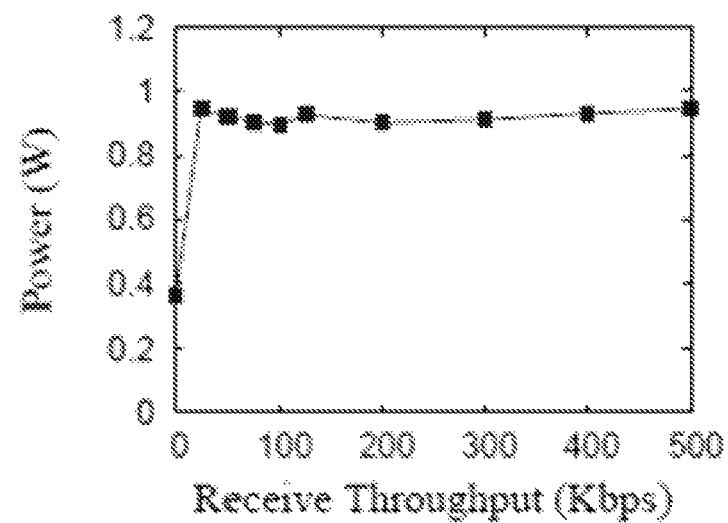

FIGS. 3A and 3B illustrate exemplary embodiments of energy consumption versus UDP (user datagram protocol) reception data rates for a GPRS/EDGE WWAN radio and a 3G WWAN radio respectively in a conventional mobile device. The following observations can be made from FIGS. 3A and 3B. Energy consumption in both the GPRS/EDGE WWAN radio and 3G WWAN radio is a non-linear function of the receive data rate. Furthermore, a high energy cost is entailed even for reception at very low data rates. Yet furthermore, the energy cost of receiving data at 10 kbps and 500 kbps in both the GPRS/EDGE WWAN radio and 3G WWAN radio is virtually identical. Thus, there is a negligible incremental energy cost for transmitting and receiving data at higher data rates.

1.3 Workload Model and Metrics

This section describes a web browsing workload and related metrics. The workload serves as an Internet access model for the OWH technique embodiments described herein. Generally speaking, either the Wi-Fi AP client or one of the other clients want to access a plurality of webpages which are located on the Internet. Such a client is hereafter referred to as a "requesting client." It is noted that the OWH technique embodiments described herein can support any client application that can operate via an HTTP proxy.

The overall period of time during which the requesting client is accessing the plurality of webpages is referred to herein as a "session." The period of time between successive web browsing sessions is referred to herein as an "idle time period." A given session begins with the requesting client initiating a first webpage access by issuing a request for the first webpage. It is noted that all webpage requests, regardless of whether they originate from the AP client itself or one of the other clients, are routed to the client HTTP proxy running on the AP client. The manner in which the OWH technique embodiments described herein process this webpage request and download the first webpage to the requesting client is described hereafter. The period of time between the first webpage being downloaded in its entirety to the requesting client (i.e., all of the data associated with the first webpage being downloaded to the requesting client), and the requesting client requesting a second webpage is hereafter referred to as a "think time period" since a user commonly reviews a current webpage that has just been downloaded before they submit a request to the client for another webpage. After this think time period the requesting client issues a request for the second webpage. After the second webpage has been downloaded in its entirety to the requesting client, there is another think time period, after which the user submits a request to the client for another webpage. This process continues until the last webpage in the session has been downloaded to the requesting client.

The sum of the energy consumed (i.e., the battery drain) in all of the available mobile devices, from the start of the first webpage download in a given session to the end of the last webpage download in the session, is hereafter referred to as the "overall energy cost" of the session. The session time period includes the time it takes to download each individual webpage in the session and the intervening think time periods between successive webpage downloads. The overall energy cost metric covers each available mobile device regardless of whether or not it is being used for striping data associated with a given webpage download. This reflects an observation that the energy consumption in a given mobile device that is available but not currently being used in the gateway is an opportunity cost, because if the mobile device had been used in the gateway the session may have completed sooner with a lower overall energy cost. The duration of time from the start of the first webpage download in a given session to the end of the last webpage download in the session is hereafter referred to as a "session completion time." It will be appreciated that a shorter session completion time may result in a lower overall energy cost since the session completes more quickly.

1.4 Process Framework

Figure 4A:
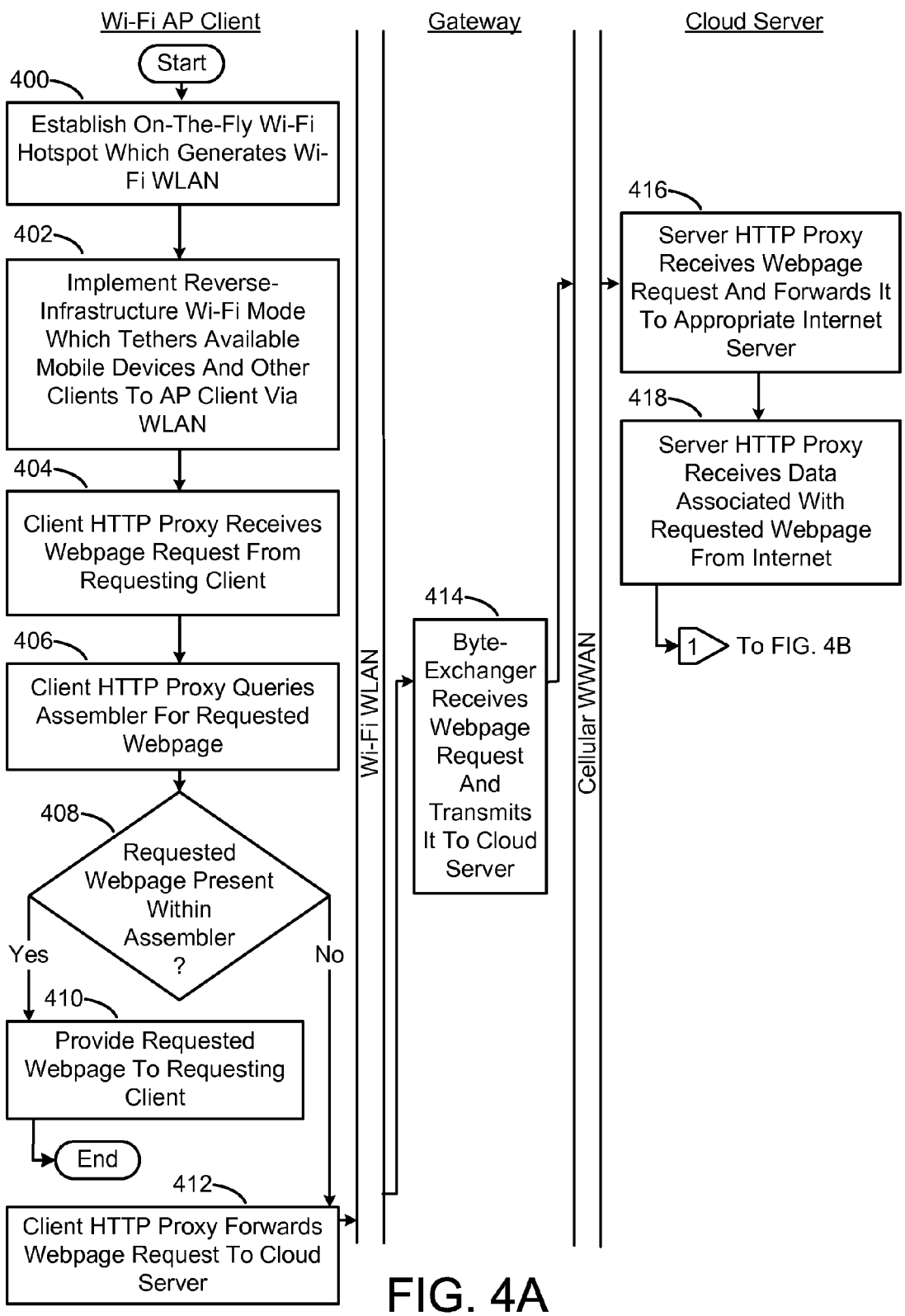
FIGS. 4A and 4B are flow diagrams illustrating an exemplary embodiment, in simplified form, of a process framework for implementing the OWH technique embodiments described herein.
Figure 4B:
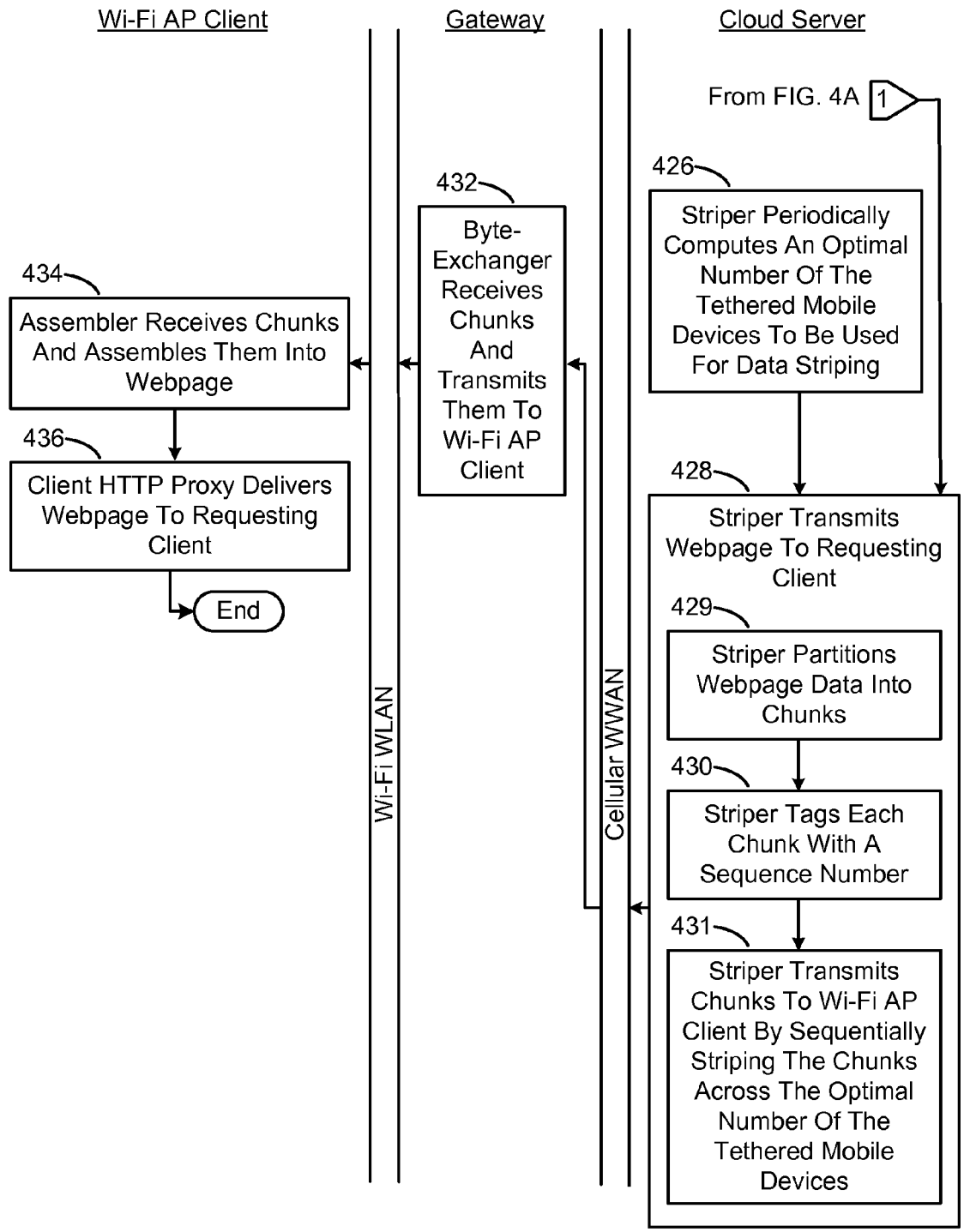

FIGS. 4A and 4B illustrate an exemplary embodiment, in simplified form, of a process framework for implementing the OWH technique embodiments described herein. As exemplified in FIG. 4A, once a client has been designated as the Wi-Fi AP, the process starts in block 400 with the Wi-Fi AP client establishing an on-the-fly Wi-Fi hotspot which generates a Wi-Fi WLAN. The AP client then implements the aforementioned reverse-infrastructure Wi-Fi mode which tethers the available mobile devices and other clients to the AP client via the WLAN (block 402). The client HTTP proxy running on the AP client then receives a webpage request from a requesting client (block 404). As described heretofore, the requesting client can be either the Wi-Fi AP client itself, or one of the other clients. The client HTTP proxy then queries the assembler running on the AP client for the requested webpage (block 406). Whenever the requested webpage is locally present within the assembler (block 408, Yes), it is provided to the requesting client (block 410).

Referring again to FIG. 4A, whenever the requested webpage is not locally present within the assembler (block 408, No), the client HTTP proxy running on the Wi-Fi AP client forwards the webpage request to the cloud server (block 412) via the gateway created by the tethered mobile devices. It is noted that the client HTTP proxy forwards webpage requests it receives on a first-come first-serve basis. The byte-exchanger running on each of the tethered mobile devices then receives the webpage request data over the Wi-Fi WLAN and transmits it at a byte-level over the cellular WWAN to the cloud server (block 414). The server HTTP proxy running on the cloud server then receives the webpage request over the WWAN and forwards the request to the appropriate Internet server on which the requested webpage is stored (block 416).

As exemplified in FIG. 4B, the striper running on the cloud server periodically computes an optimal number of the tethered mobile devices to be used for data striping (block 426). The method employed for this computation will be described in more detail hereafter. It will be appreciated that whenever just one mobile device is tethered to the Wi-Fi AP client, the optimal number of the tethered mobile devices to be used for data striping will simply be one.

Referring again to FIGS. 4A and 4B, once the server HTTP proxy receives all of the data associated with the requested webpage from the Internet (block 418) (i.e., once all the data for the webpage is downloaded from the Internet and stored locally on the cloud server), the striper transmits the webpage to the requesting client (block 428) by striping the data associated with the webpage across the optimal number of the tethered mobile devices, where this striping occurs in the following manner. The striper first partitions the webpage data into prescribed sized chunks (block 429), and tags each chunk with a sequence number (block 430). In one embodiment of the OWH technique described herein this partitioning is performed using the HTTP byte-range mechanism. Alternate embodiments of the OWH technique are also possible where this partitioning is performed using other techniques. The striper then transmits the chunks to the Wi-Fi AP client by sequentially striping the chunks across the optimal number of the tethered mobile devices (block 431). In one embodiment of the OWH technique this transmission occurs in a single burst, which minimizes the occurrence of the aforementioned energy tail to a single episode on each of the optimal number of tethered mobile devices. Alternate embodiments of the OWH technique are also possible where this transmission occurs in ways other than a single burst.

Referring again to FIG. 4B, the byte-exchanger running on each of the optimal number of tethered mobile devices then receives given chunks over the cellular WWAN and transmits them at a byte-level over the Wi-Fi WLAN to the Wi-Fi AP client (block 432). The assembler running on the AP client then receives the chunks over the WLAN and assembles them into the webpage (block 434). Once the assembler has received all of the chunks and the webpage has been fully assembled (block 434), the client HTTP proxy running on the AP client delivers the webpage to the requesting client (block 436). Whenever the requesting client is one of the other clients, the client HTTP proxy will transmit the webpage over the WLAN to the appropriate other client.

1.5 Reverse-infrastructure Wi-Fi Mode

As is appreciated in the art of mobile device technology, the Wi-Fi WLAN radio in a mobile device is another dominant consumer of energy compared to the other electronic components in the mobile device. This section describes the operation of the aforementioned reverse-infrastructure Wi-Fi mode that is implemented by the Wi-Fi AP client and tethers available mobile devices and other clients to the AP client via the Wi-Fi WLAN that is generated by the on-the-fly Wi-Fi hotspot established by the AP client. As will be described hereafter, this tethering is implemented in an energy-efficient manner since it minimizes the energy consumed by the WLAN radio in each mobile device and each other client.

Referring again to FIG. 1, each available mobile device 102 and each other client 106 that is located within the range of the aforementioned on-the-fly Wi-Fi hotspot established by the Wi-Fi AP client 100 joins the Wi-Fi WLAN 108 by associating with the AP client as a Wi-Fi client, thus establishing a tethering connection between the AP client and each available mobile device, and between the AP client and each other client. It is noted that nearly all of the mobile devices that exist today support the Wi-Fi client mode of operation. Whenever a new mobile device becomes available, it can also join the WLAN by associating with the AP client as a Wi-Fi client. Whenever an existing mobile device that is currently a member of the WLAN becomes unavailable, it can leave the WLAN by disassociating with the AP client. New other clients can also join the WLAN by associating with the AP client as Wi-Fi clients, and existing other clients that are currently a member of the WLAN can leave the WLAN by disassociating with the AP client.

The Wi-Fi AP client periodically transmits a beacon (also known as a beacon frame) over the Wi-Fi WLAN to each tethered mobile device and each other client that is associated with the AP client as a Wi-Fi client, where this periodic beacon transmission occurs at a prescribed time interval that is hereafter referred to as an "optimal beacon interval." Generally speaking and as is appreciated in the art of wireless communication networks, the beacon provides the "heartbeat" of the WLAN and enables each tethered mobile device, each other client, and the AP client to establish and maintain communications in an orderly manner. By way of example but not limitation, the beacon includes a time stamp which each tethered mobile device and each other client that receives the beacon uses to adjust its local timer, thus synchronizing each tethered mobile device and each other client to the AP client. The optimal beacon interval is a prescribed amount of time between successive beacon transmissions that minimizes the energy consumed in each tethered mobile device when it is not being used for transferring data to or from the cellular WWAN.

The optimal beacon interval is computed by the aforementioned client HTTP proxy which runs on the Wi-Fi AP client. This generally serves to minimize the total mobile device energy cost associated with the aforementioned web browsing workload of downloading a plurality of webpages from the Internet to a requesting client. Given this workload setting, the following tradeoff exists in the choice of the beacon interval. A shorter beacon interval increases the beacon processing overhead and thus increases the energy consumption in each tethered mobile device. On the other hand, since a webpage download will begin after half a beacon interval on average, a shorter beacon interval reduces the time to complete a webpage download and thus results in an overall lower base energy consumption in each tethered mobile device that the webpage data is striped across.

The responsibility for beacon transmissions and staying awake lies on the Wi-Fi AP client. Thus, each of the one or more tethered mobile devices being utilized to create the gateway are configured to operate in the conventional Wi-Fi adaptive power save mode (PSM). Each tethered mobile device remains in PSM until it is time to receive the beacon or transfer data between the Wi-Fi WLAN and cellular WWAN. It is noted that nearly all of the mobile devices that exist today support the adaptive PSM. Due to the aforementioned synchronization, the tethered mobile devices all periodically wake-up from their PSM and switch to a continuously active mode (CAM) upon the expiration of the optimal beacon interval (i.e., the tethered mobile devices all periodically wake-up at the same time). This synchronized, periodic wake-up allows each tethered mobile device to receive the beacon and to learn whether or not the AP client has any other data that is ready to be transferred to the cellular WWAN. When the all the data for a given requested webpage is downloaded from the Internet to the cloud server, and the striper running thereon begins transmitting this data to the AP client by striping this data across the aforementioned optimal number of the tethered mobile devices, each device to which data is being striped switches to CAM. Once the data transmission to the AP client is complete, each of these tethered mobile devices switches back to PSM.

In one embodiment of the OWH technique described herein, the following equations are used to compute the optimal beacon interval. The variable $T_n$ denotes a web browsing workload task to download an nth webpage to a requesting client. The variable b denotes a beacon interval for a given distribution of think time periods. The variable $b_{optimal}$ denotes the optimal beacon interval. The variable $\alpha$ denotes a wake-up energy cost (in Joules) for a given beacon reception by a given tethered mobile device. The variable $\theta$ denotes the base power (in Watts) consumed by a given tethered mobile device excluding the power consumed by the Wi-Fi WLAN radio and the cellular WWAN radio therein. The variable $d_n$ denotes the think time period between successive webpage downloads (i.e., $d_n$ denotes the duration of time between $T_{(n-1)}$ and succeeding $T_n$). In other words, assuming a given task $T_1$ arrives at the Wi-Fi AP client at time $d_1$, then succeeding task $T_2$ arrives at the AP client $d_2$ seconds after $T_1$ is completed. The variable $D_{avg}$ denotes an average think time period. The variable $I_{avg}$ denotes an average idle time period. The variable $C_n$ denotes the Wi-Fi CAM energy consumed by the tethered mobile devices across which data is being striped during $T_n$. The variable $E_{T_n}$ denotes the cumulative energy consumed by the tethered mobile devices across which data is being striped during $T_1$ through $T_n$ (i.e., the cumulative energy consumed during the download of the first through nth webpages).

The total energy consumed during the completion of a given task $T_n$ can be expressed as the sum of the energy cost associated with receiving the beacons during the think time period $d_n$, the energy cost of the base power $\theta$ consumed during the think time period $d_n$, the energy cost of the base power $\theta$ consumed during half the beacon interval b (on average) until the download of the nth webpage begins, and the energy cost associated with the Wi-Fi WLAN radio in CAM while the download is taking place (i.e., $C_n$). Thus, the total energy consumed during the download of the first webpage can be given by the following equation:

$$E_{T_1} = \frac{d_1}{b} \cdot \alpha + \left(d_1 + \frac{b}{2}\right) \cdot \theta + C_1, \quad (1)$$

which can be re-written as:

$$E_{T_1} = \left[\left(1 + \frac{\alpha}{b\theta}\right) \cdot d_1 + \frac{b}{2}\right] \cdot \theta + C_1. \quad (2)$$

The cumulative energy consumed during the download of the first and second webpages can be given by the following equation:

$$E_{T_2} = \left[\left(1 + \frac{\alpha}{b\theta}\right) \cdot d_2 + \frac{b}{2}\right] \cdot \theta + C_2 + E_{T_1}. \quad (3)$$

Thus, $E_{T_n}$ can be given by the following equation:

$$E_{T_n} = \left[\left(1 + \frac{\alpha}{b\theta}\right) \cdot \sum_{i=1}^{n} d_i + n\frac{b}{2}\right] \cdot \theta + \sum_{i=1}^{n} C_i, \quad (4)$$

which can be re-written as:

$$E_{T_n} = \left[\left(1 + \frac{\alpha}{b\theta}\right) \cdot D_{avg} + \frac{b}{2}\right] \cdot n \cdot \theta + \sum_{i=1}^{n} C_i. \quad (5)$$

The optimal beacon interval is then derived by minimizing equation (5) for energy, where the minimization is performed by differentiating equation (5) with respect to b and setting the resulting term to zero. This minimization operation results in the following equation:

$$b_{optimal} = \sqrt{\frac{2D_{avg}\alpha}{\theta}}. \quad (6)$$

Based on equation (6), $b_{optimal}$ will be longer if think time periods are long (or beacon processing costs are high), and $b_{optimal}$ will be shorter if the base energy cost of the mobile devices dominates (since each tethered mobile device is assumed to be turned on and draining base energy regardless of whether or not it is being used to transfer data between the cellular WWAN and Wi-Fi WLAN). Thus, equation (6) agrees with intuition.

Generally speaking, in an alternate embodiment of the OWH technique described herein the energy efficiency of the tethering of available mobile devices and other clients to the Wi-Fi AP client can be further optimized by employing two different optimal beacon intervals. More particularly, $b_{optimal}$ can be used during a given web browsing session, and a second optimal beacon interval ($b_{optimal\_session}$) can be computed for use during the idle time period between successive web browsing sessions. This second optimal beacon interval can be given by the following equation:

$$b_{optimal\_session} = \sqrt{\frac{2I_{avg}\alpha}{\theta}}. \quad (7)$$

The reverse-infrastructure mode of Wi-Fi operation is further advantageous for various reasons including, but not limited to, the following. The Wi-Fi AP client consolidates the data transfers to and from each other client, thus enabling centralized optimization of bandwidth in the Wi-Fi WLAN and energy resources in the gateway. Each tethered mobile device being utilized to create the gateway can put its Wi-Fi WLAN radio to sleep when it is not in use in order to conserve energy in the device. As new mobile devices or new other clients join the WLAN (i.e., become tethered thereto), or as existing mobile devices or existing other clients leave the WLAN (i.e., become un-tethered thereto), the rest of the WLAN is unaffected. In the case where the client that is designated as the Wi-Fi AP (i.e., the Wi-Fi AP client) leaves the WLAN, the clients remaining on the WLAN will detect an absence of the beacon. Then, a conventional leader election procedure can be implemented on these remaining clients in order to designate another client as the Wi-Fi AP.

1.6 Energy-aware Striper

This section provides a more detailed description of the operation of the aforementioned periodic computation by the striper (which runs on the cloud server) of an optimal number of the tethered mobile devices to be used for data striping. Generally speaking, simply performing data striping across the entire set of tethered mobile devices may result in an energy-inefficient download of the webpage to the requesting client. More particularly, in the case where there is a plurality of available mobile devices which are tethered to the Wi-Fi AP client to create the gateway, performing data striping across the entire set of tethered mobile devices can result in speeding up the webpage download to the requesting client, and thus can minimize the session completion time. However, the energy tail behavior of the GPRS/EDGE WWAN radio exemplified in FIG. 2A and the energy tail behavior of the 3G WWAN radio exemplified in FIG. 2B translate into a significant, fixed, set-up energy cost associated with tethering each available mobile device to the AP client and using each tethered device to transfer data through the gateway. Thus, due to this energy cost there is a tradeoff between using a given tethered mobile device for data striping in order to speed-up the webpage download to the requesting client (thereby resulting in an overall lower base energy consumption in each tethered mobile device for the duration of the download), versus optimizing the energy efficiency of the download (i.e., minimizing the overall energy consumed in each tethered mobile device during the download).

As will now be described, in its periodic computation of an optimal number of the tethered mobile devices to be used for data striping, the striper implements an energy-aware-balanced procedure that exploits the aforementioned notable energy characteristics of the cellular WWAN radio in order to minimize energy consumption in each of the tethered mobile devices. As will be appreciated from the more detailed description that follows, the energy-aware-balanced procedure takes the fixed, set-up energy cost for each tethered mobile device into account and minimizes the skew in the residual battery life of each of the tethered mobile devices. The striper thus serves to optimize the energy efficiency of the data transfer through the gateway.

Figure 5:
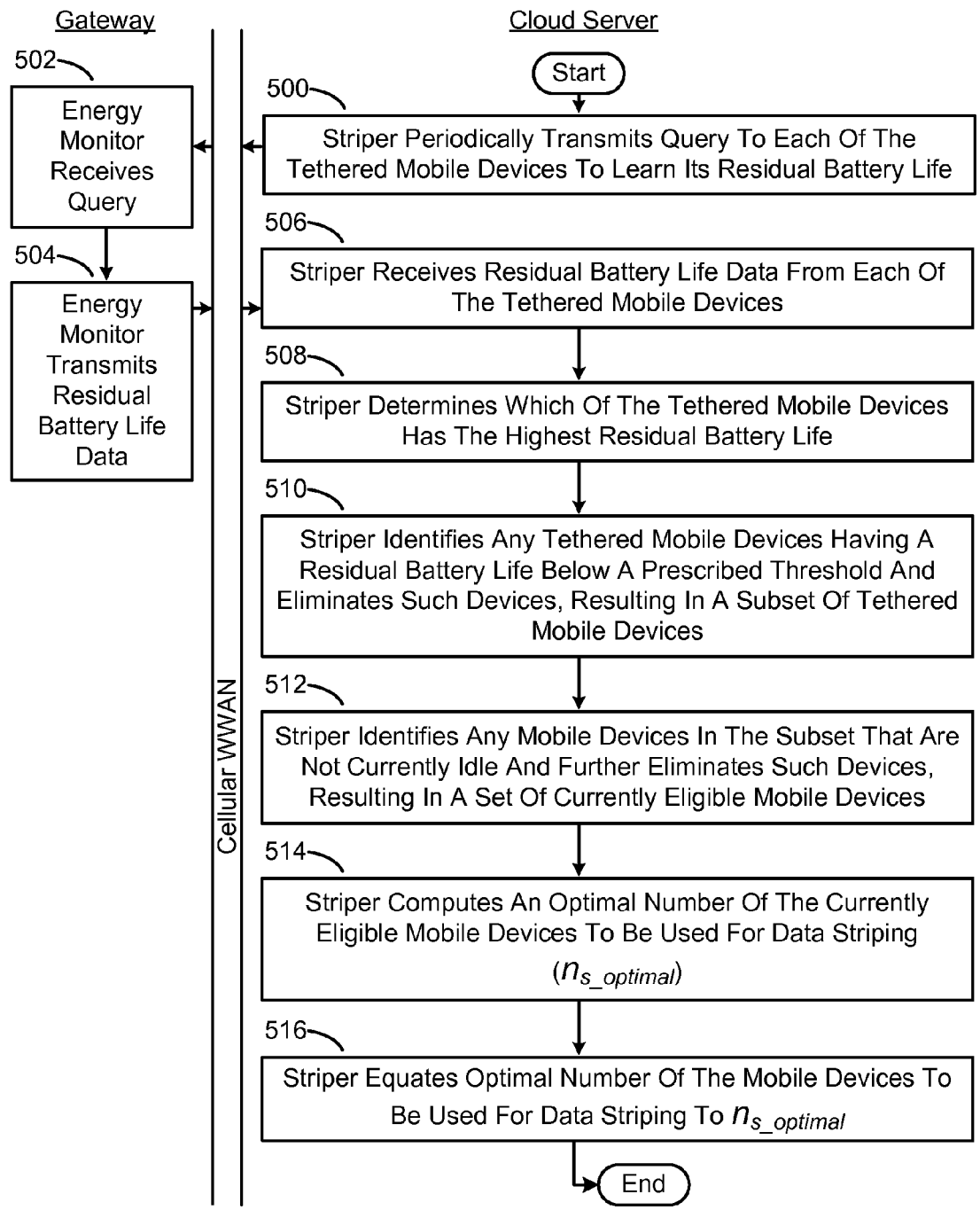
FIG. 5 is a flow diagram illustrating an exemplary embodiment, in simplified form, of a process for periodically computing an optimal number of mobile devices to be used for data striping.

FIG. 5 illustrates an exemplary embodiment, in simplified form, of a process for periodically computing an optimal number of the tethered mobile devices to be used for data striping. As exemplified in FIG. 5, the process starts in block 500 with the striper periodically transmitting a query to each of the tethered mobile devices over the cellular WWAN to learn the residual battery life thereof, where this transmission is performed at a prescribed interval of time. In an exemplary embodiment of the OWH technique described herein the prescribed interval of time is 30 seconds. Alternate embodiments of the OWH technique are also possible where the prescribed interval of time is either less than 30 seconds or greater than 30 seconds. Upon the energy monitor which runs on each tethered mobile device receiving the query over the WWAN (block 502), the energy monitor responds by transmitting the residual battery life data for the device to the cloud server over the WWAN (block 504).

Referring again to FIG. 5, upon the striper receiving residual battery life data from each of the tethered mobile devices over the cellular WWAN (block 506), the striper determines which of the tethered mobile devices has the highest residual battery life (block 508). The striper then identifies any tethered mobile devices having a residual battery life that is below a prescribed threshold and eliminates such devices, resulting in a subset of tethered mobile devices (block 510). In an exemplary embodiment of the OWH technique the prescribed threshold is five percent of the maximum capacity of the battery in the tethered mobile device having the highest residual battery life. Alternate embodiments of the OWH technique are also possible where the prescribed threshold is either less than five percent or greater than five percent. The striper then identifies any mobile devices in the subset of tethered mobile device that are not currently idle and further eliminates such devices, resulting in a set of currently eligible mobile devices (block 512) (i.e., a set of mobile devices that are currently eligible to be used for data striping). The striper then computes an optimal number of the currently eligible mobile devices to be used for data striping ($n_{s\_optimal}$) (block 514). One implementation of an equation for this computation is derived hereafter. Finally, the optimal number of the mobile devices to be used for data striping is equated to $n_{s\_optimal}$ (block 516).

The variable n denotes the total number of currently eligible mobile devices. The variable $n_s$ denotes the number of currently eligible mobile devices to be used for data striping. The variable $P_{base}$ denotes the base power consumed (i.e., the base energy consumed per second) by a given currently eligible mobile device when it is not being used for data striping. The variable $P_{stripe}$ denotes the base power consumed by a given currently eligible mobile device when it is being used for data striping (i.e., $P_{stripe}$ excludes the energy cost associated with the radios in the mobile device). It is noted that $P_{stripe}$ is generally greater than $P_{base}$ due to the extra CPU (central processing unit) energy cost associated with processing and forwarding data from the cellular WWAN to the Wi-Fi WLAN. For simplicity, it can be assumed that all of the mobile devices are homogeneous, resulting in $P_{base}$ and $P_{stripe}$ being the same for all of the currently eligible mobile devices. The variable S denotes the number of bits of data that are associated with a given webpage.

The energy cost associated with the radios in each of the currently eligible mobile devices that is used for data striping will now be considered. The variable $E_{setup}$ denotes the fixed component of the radio energy cost associated with using a given currently eligible mobile device for data striping. In other words, $E_{setup}$ denotes the energy tail described heretofore. The variable B denotes the speed at which a given currently eligible mobile device transfers data over the cellular WWAN. It is assumed that the overall speed of a given data transfer through the gateway primarily depends on the WWAN radio within the mobile device rather than the Wi-Fi WLAN radio therein. The variable $E_{bit}$ denotes the total energy cost of receiving a data bit over the WWAN radio and transferring the data bit onto the WLAN using the WLAN radio. Although the energy cost associated with receiving data over the WWAN radio has a non-linear energy profile as exemplified in FIGS. 3A and 3B, the receive energy cost corresponding to an average data rate over the WWAN radio is used to compute $E_{bit}$. The aforementioned assumption that of the mobile devices are homogeneous results in $E_{setup}$, B and $E_{bit}$ being the same for all of the mobile devices.

The total energy cost associated with downloading S bits of data over a period of time t using $n_s$ mobile devices can be computing as the sum of the base powers of all the currently eligible phones during the period of time t plus the energy cost associated with both the cellular WWAN radio and Wi-Fi WLAN radio in the $n_s$ mobile devices that are used for data striping. In other words, the total energy cost associated with downloading S bits of data over a period of time t using $n_s$ mobile devices can be given by the following equation:

$$[(n - n_s) \cdot P_{base} + n_s \cdot P_{stripe}] \cdot t + n_s \cdot \left[E_{setup} + \left(\frac{S}{n_s}\right) \cdot E_{bit}\right]. \quad (8)$$

Since the server HTTP proxy gathers all the data for the requested webpage as described heretofore before the striper stripes the webpage data across the optimal number of currently eligible mobile devices, the striper knows the total size of the download (i.e., the striper knows S). Based on the assumption that data striping across $n_s$ mobile devices results in a linear speed-up in the rate at which the webpage data is downloaded to the requesting client, t can be expressed as $S/n_s \cdot B$). Using this substitution for t, equation (8) can be re-written as:

$$\frac{n \cdot P_{base} \cdot S}{n_s \cdot B} + n_s \cdot E_{setup} + S \cdot \left(\frac{P_{stripe} - P_{base}}{B} + E_{bit}\right). \quad (9)$$

The total energy cost given by equation (9) can be minimized by first differentiating equation (9) with respect to $n_s$, and then setting the result of this differentiation to zero. Based on these minimization operations, an optimal number of the currently eligible mobile devices to be used for data striping ($n_{s\_optimal}$) can be given by the following equation:

$$n_{s\_optimal} = \min\left(n, \sqrt{\frac{(n \cdot P_{base} \cdot S)}{(E_{setup} \cdot B)}}\right), \quad (10)$$

where $n_{s\_optimal}$ minimizes the total energy cost associated with downloading the requested webpage to the requesting client (i.e., $n_{s\_optimal}$ delivers the webpage data to the client in an energy-efficient manner).

In the situation where all of the mobile devices are not homogeneous, the variable $P_{base}(i)$ can be used to denote the base power consumed by the ith currently eligible mobile device when it is not being used for data striping, and $\Sigma_{i=1}^{n} P_{base}(i)$ can be substituted for $(n \cdot P_{base})$ in equation (10). The variable $P_{stripe}(i)$ can similarly be used to denote the base power consumed by the ith currently eligible mobile device when it is being used for data striping, and the different values of $P_{stripe}(i)$ can be similarly accounted for in equation (9). It is noted that B is likely to be similar for all the mobile devices, even if they are not homogeneous, since they are co-located in a common vicinity. However, in the situation where B is not similar for all the mobile devices, the variable B(i) can similarly be used to denote the cellular WWAN data transfer speed for the ith currently eligible mobile device, and the different values of B(i) can be similarly accounted for in equation (10).

The functionality of the striper is advantageous for a variety of reasons including, but not limited to, the following. In situations where a plurality of available mobile devices is co-located in the vicinity of the Wi-Fi AP client, the striper can utilize a plurality of mobile devices to create the gateway. The striper also serves to optimize the battery life of each mobile device and thus optimizes the operating lifetime of each mobile device. The striper also serves to maximize the number of webpage requests that can be serviced by the gateway until any one mobile device runs out of battery power.

2.0 Additional Embodiments

While the OWH technique has been described by specific reference to embodiments thereof, it is understood that variations and modifications thereof can be made without departing from the true spirit and scope of the OWH technique. By way of example but not limitation, although the OWH technique embodiments described heretofore provide support for web-based information access, an alternate embodiment of the OWH technique is possible which provides broader support for all application types by implementing the striper at a lower layer in the communication protocol stack (such as the transport layer, among other layers). Additionally, rather than each of the other clients being connected to the Wi-Fi AP client via the Wi-Fi WLAN, one or more of the other clients can be connected to the AP client via a wired LAN connection such as Ethernet, and the like.

It is also noted that any or all of the aforementioned embodiments can be used in any combination desired to form additional hybrid embodiments. Although the OWH technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

This section provides a brief, general description of a suitable computing system environment in which portions of the OWH technique embodiments described herein can be implemented. These OWH technique embodiments are operational with numerous general purpose or special purpose computing system environments or configurations. Exemplary well known computing systems, environments, and/or configurations that can be suitable include, but are not limited to, personal computers (PCs), server computers, hand-held devices (such as mobile phones and the like), laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 6:
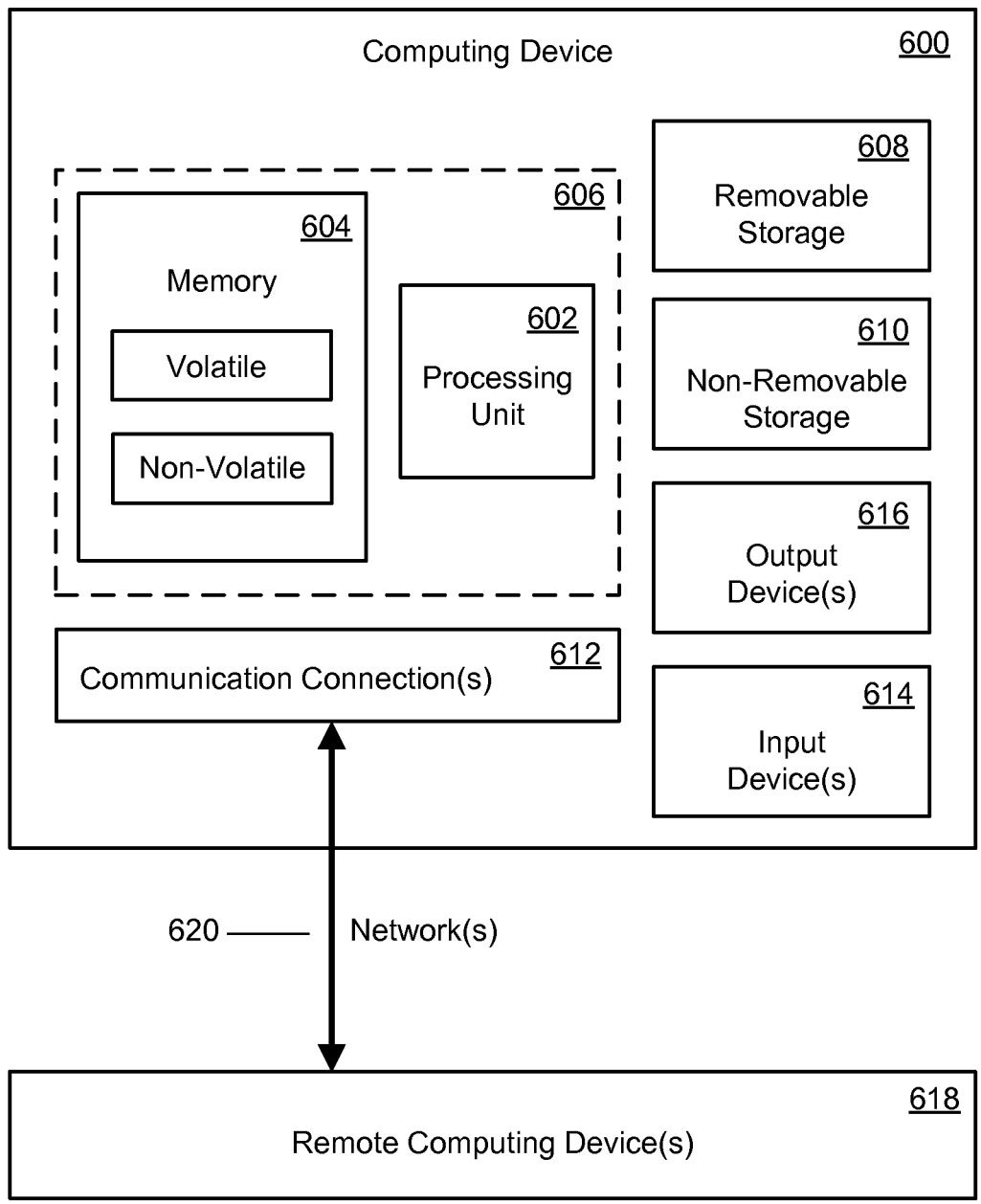
FIG. 6 is a diagram illustrating an exemplary embodiment, in simplified form, of a general purpose, network-based computing device which constitutes an exemplary system for implementing portions of the OWH technique embodiments described herein.

FIG. 6 illustrates an exemplary embodiment, in simplified form, of a suitable computing system environment according to the OWH technique embodiments described herein. The environment illustrated in FIG. 6 is only one example of a suitable computing system environment and is not intended to suggest any limitation as to the scope of use or functionality of the OWH technique embodiments described herein. Neither should the computing system environment be interpreted as having any dependency or requirement relating to any one or combination of components exemplified in FIG. 6.

As exemplified in FIG. 6, an exemplary system for implementing portions of the OWH technique embodiments described herein includes one or more computing devices, such as computing device 600. In its simplest configuration, computing device 600 typically includes at least one processing unit 602 and memory 604. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 also includes a communications connection(s) 612 that allows the device to operate in a networked environment and communicate with a remote computing device(s), such as remote computing device(s) 618. Remote computing device(s) 618 can be a PC, a server, a router, a peer device, or other common network node, and typically includes many or all of the elements described herein relative to computing device 600. Communication between computing devices takes place over a network(s) 620, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 612 and related network(s) 620 described herein are exemplary and other means of establishing communication between the computing devices can be used.

As exemplified in FIG. 6, communications connection(s) 612 and related network(s) 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 6, computing device 600 also includes a user interface which includes one or more input devices 614 and one or more output devices 616. Exemplary input devices 614 include, but are not limited to, a keyboard, mouse, pen, touch input device, sound input device (such as a microphone and the like), and camera, among others. A user can enter commands and various types of information into the computing device 600 through the input device(s) 614. Exemplary output devices 616 include, but are not limited to, a display device(s), printer, and audio output devices, among others. These input and output devices are well known and need not be described at length here.

Referring again to FIG. 6, the OWH technique embodiments described herein can be further described and/or implemented in the general context of computer-executable instructions, such as program modules, which are executed by computing device 600. Generally, program modules include routines, programs, objects, components, and data structures, among other things, that perform particular tasks or implement particular abstract data types. The OWH technique embodiments can also be practiced in a distributed computing environment where tasks are performed by one or more remote computing devices 618 that are linked through a communications network 612/620. In a distributed computing environment, program modules can be located in both local and remote computer storage media including, but not limited to, memory 604 and storage devices 608/610.

Wherefore, what is claimed is:

1. A computer-implemented process for utilizing a cloud server computer to deliver a webpage to a requesting client computer via a plurality of mobile devices, comprising:
using the cloud server computer to perform the following process actions:
periodically computing a number of the mobile devices to be used for data striping; and
transmitting the webpage to the requesting client computer by striping data associated with the webpage across the number of the mobile devices.

2. The process of claim 1, wherein the process action of periodically computing the number of the mobile devices to be used for data striping comprises the actions of:
periodically transmitting at a prescribed interval of time a query to each of the mobile devices to learn its residual battery life, wherein said transmission occurs over a wireless wide area network (WWAN);
receiving residual battery life data from each of the mobile devices;
identifying any mobile devices having a residual battery life that is below a prescribed threshold and eliminating such mobile devices, resulting in a subset of mobile devices;
identifying any mobile devices in said subset that are not currently idle and further eliminating such devices, resulting in a set of currently eligible mobile devices;
computing an optimal number of the currently eligible mobile devices to be used for data striping ($n_{s\_optimal}$); and
equating the optimal number of the mobile devices to be used for data striping to $n_{s\_optimal}$.

3. The process of claim 2, wherein the prescribed interval of time is 30 seconds.

4. The process of claim 2, wherein,
the process action of periodically computing an optimal number of the mobile devices to be used for data striping further comprises an action of determining which of the mobile devices has the highest residual battery life, and
the prescribed threshold is five percent of the maximum capacity of the battery in the mobile device having the highest residual battery life.

5. The process of claim 2, wherein the optimal number of the currently eligible mobile devices to be used for data striping ($n_{s\_optimal}$) is given by the equation $$n_{s\_optimal} = \min\left(n, \sqrt{\frac{(n \cdot P_{base} \cdot S)}{(E_{setup} \cdot B)}}\right),$$

wherein n is the total number of currently eligible mobile devices, $P_{base}$ is the base power consumed by a given currently eligible mobile device when it is not being used for data striping, S is the number of bits of data that are associated with the webpage, $E_{setup}$ is a fixed component of a radio energy cost associated with using a given currently eligible mobile device for data striping, and B is the speed at which a given currently eligible mobile device transfers data over the WWAN.

6. The process of claim 1, wherein the process action of transmitting the webpage to the requesting client computer by striping data associated with the webpage across the number of mobile devices comprises the actions of:
partitioning the data associated with the webpage into prescribed sized chunks;
tagging each chunk with a sequence number; and
transmitting the chunks to the requesting client computer by sequentially striping the chunks across the number of the mobile devices.

7. The process of claim 6, wherein the process action of partitioning the data associated with the webpage into prescribed sized chunks comprises using an Hypertext Transfer Protocol byte-range mechanism.

8. The process of claim 6, wherein the chunks are transmitted to the requesting client in a single burst.

9. A system for utilizing a cloud server computer to deliver a webpage to a requesting client computer via a plurality of mobile devices, comprising:
a cloud server computer; and
a computer program having program modules executable by the computing device, the cloud server computer being directed by the program modules of the computer program to,
periodically compute a number of the mobile devices to be used for data striping; and
transmit the webpage to the requesting client computer by striping data associated with the webpage across the number of the mobile devices.

10. The system of claim 9, wherein the program module for periodically computing the number of the mobile devices to be used for data striping comprises sub-modules for:
periodically transmitting at a prescribed interval of time a query to each of the mobile devices to learn its residual battery life, wherein said transmission occurs over a wireless wide area network (WWAN);
receiving residual battery life data from each of the mobile devices;
identifying any mobile devices having a residual battery life that is below a prescribed threshold and eliminating such mobile devices, resulting in a subset of mobile devices;
identifying any mobile devices in said subset that are not currently idle and further eliminating such devices, resulting in a set of currently eligible mobile devices;
computing an optimal number of the currently eligible mobile devices to be used for data striping ($n_{s\_optimal}$); and
equating the optimal number of the mobile devices to be used for data striping to $n_{s\_optimal}$.

11. The system of claim 10, wherein the program module for periodically computing an optimal number of the mobile devices to be used for data striping further comprises sub-modules for:
determining which of the mobile devices has the highest residual battery life; and
establishing the prescribed threshold to be five percent of the maximum capacity of the battery in the mobile device having the highest residual battery life.

12. The system of claim 10, wherein the prescribed interval of time is 30 seconds.

13. The system of claim 10, wherein the optimal number of the currently eligible mobile devices to be used for data striping ($n_{s\_optimal}$) is given by the equation $$n_{s\_optimal} = \min\left(n, \sqrt{\frac{(n \cdot P_{base} \cdot S)}{(E_{setup} \cdot B)}}\right),$$

wherein n is the total number of currently eligible mobile devices, $P_{base}$ is the base power consumed by a given currently eligible mobile device when it is not being used for data striping, S is the number of bits of data that are associated with the webpage, $E_{setup}$ is a fixed component of a radio energy cost associated with using a given currently eligible mobile device for data striping, and B is the speed at which a given currently eligible mobile device transfers data over the WWAN.

14. The system of claim 9, wherein the program module for transmitting the webpage to the requesting client computer by striping data associated with the webpage across the number of mobile devices comprises sub-modules for:
partitioning the data associated with the webpage into prescribed sized chunks;
tagging each chunk with a sequence number; and
transmitting the chunks to the requesting client computer by sequentially striping the chunks across the number of the mobile devices.

15. The system of claim 14, wherein the sub-module for partitioning the data associated with the webpage into prescribed sized chunks comprises using an Hypertext Transfer Protocol byte-range mechanism.

16. The system of claim 14, wherein the chunks are transmitted to the requesting client in a single burst.

17. A computer storage medium having computer-executable instructions stored thereon for utilizing a cloud server computer to deliver a webpage to a requesting client computer via a plurality of mobile devices, said computer-executable instructions comprising:
periodically computing a number of the mobile devices to be used for data striping; and
transmitting the webpage to the requesting client computer by striping data associated with the webpage across the number of the mobile devices.

18. The computer storage medium of claim 17, wherein the instruction for periodically computing the number of the mobile devices to be used for data striping comprises sub-instructions for:
periodically transmitting at a prescribed interval of time a query to each of the mobile devices to learn its residual battery life, wherein said transmission occurs over a wireless wide area network (WWAN);
receiving residual battery life data from each of the mobile devices;
identifying any mobile devices having a residual battery life that below a prescribed threshold and eliminating such mobile devices, resulting in a subset of mobile devices;
identifying any mobile devices in said subset that are not currently idle and further eliminating such devices, resulting in a set of currently eligible mobile devices;
computing an optimal number of the currently eligible mobile devices to be used for data striping ($n_{s\_optimal}$); and
equating the optimal number of the mobile devices to be used for data striping to $n_{s\_optimal}$.

19. The computer storage medium of claim 18, wherein the instruction for periodically computing an optimal number of the mobile devices to be used for data striping further comprises sub-instructions for:
determining which of the mobile devices has the highest residual battery life; and
establishing the prescribed threshold to be five percent of the maximum capacity of the battery in the mobile device having the highest residual battery life.

20. The computer storage medium of claim 17, wherein the instruction for transmitting the webpage to the requesting client computer by striping data associated with the webpage across the number of mobile devices comprises sub-instructions for:
partitioning the data associated with the webpage into prescribed sized chunks;
tagging each chunk with a sequence number; and
transmitting the chunks to the requesting client computer by sequentially striping the chunks across the number of the mobile devices.

* * * * *